May 7, 1963     S. RUBEN     3,088,991
ELECTRIC CURRENT PRODUCING CELL
Filed Jan. 6, 1960
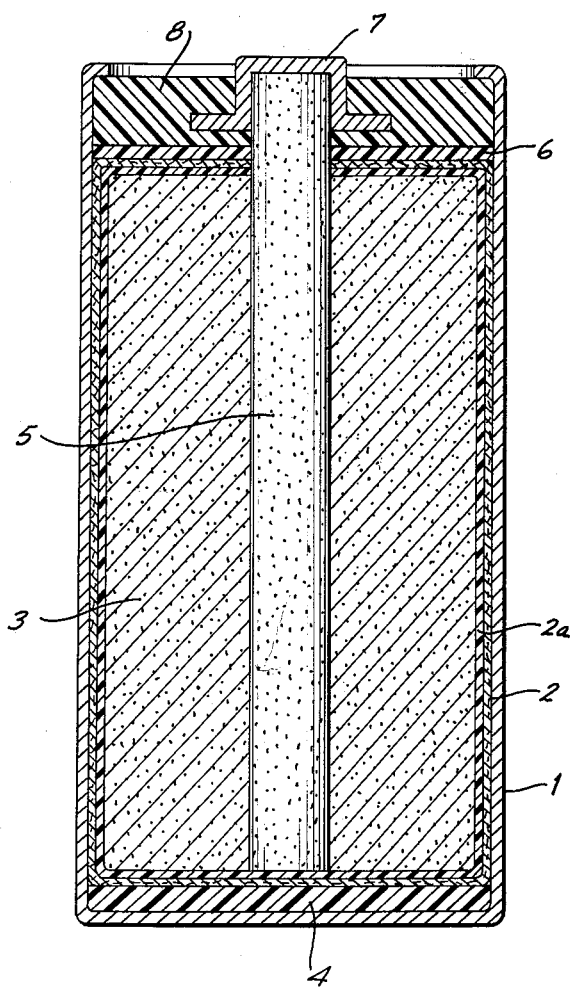
INVENTOR.
SAMUEL RUBEN
BY
ATTORNEY

3,088,991
ELECTRIC CURRENT PRODUCING CELL
Samuel Ruben, 271 North Ave., New Rochelle, N.Y.
Filed Jan. 6, 1960, Ser. No. 754
7 Claims. (Cl. 136—106)

This invention relates to electric current producing cells, and, more particularly, to a galvanic cell utilizing a basic compound of mercury as its cathode depolarizer.

Objects of the invention are to provide a cell having a high ratio of current output capacity to cell volume, a relatively high ratio of current output above accepted cut-off voltage to total current output capacity, a substantially sustained voltage or flat voltage discharge curve with continuous output throughout a relatively long cell life, negligible leakage of end products after operating life and a relatively long shelf or open circuit life without undue internal deterioration. It is desired to provide such a cell utilizing a mercury compound depolarizer which does not require the special structures employed in the mercuric oxide alkaline cell and which may be easily and conveniently produced in a number of cell and battery structures.

Other and further objects and advantages of the invention will become apparent from the following description and from the accompanying drawing, which is a longitudinal sectional view, having parts in elevation, of a cell structure embodying the invention.

The compounds of mercury when used as depolarizer electrodes in primary cells provide high ampere hour capacity in a small volume, due to the high density of such compounds and due to the fact that such compounds are readily reduced to a metallic state without the formation of intermediate compounds which are inactive or have a lower potential, as is the case when manganese dioxide is used as a depolarizer in neutral electrolytes.

Mercuric oxide is successfully used as a depolarizer in commercial cells and batteries, the electrolyte being an alkaline solution having a negligible dissolving action on the mercuric oxide, as exemplified in my Patent No. 2,422,045. Cells of this general type usually require special structures to positively prevent leakage of the corrosive electrolyte.

The relatively inexpensive structures characteristic of standard zinc-carbon manganese dioxide cells are possible as a result of the use of sal ammoniac electrolytes. To use such structures with a reducible metal compound, specifically with a mercury compound, it is essential that the compound be stable in the electrolyte and be ionically reducible. Mercuric oxide, although stable in neutral electrolytes, produces a lower voltage and polarizes on load.

In my Patent No. 2,814,664, I describe a primary cell utilizing a depolarizer of mercuric dioxysulfate. The present invention is an improvement over the cell described in that patent and comprises a cell employing mercuric dioxychromate as its negative reactant or depolarizer.

I have found that mercuric dioxychromate ($3HgO.CrO_3$ or $2HgO.HgCrO_4$)

is much less soluble in electrolyte than the mercuric dioxysulfate and thereby reduces to a negligible value secondary amalgamation effects due to soluble mercuric compounds in the electrolyte. It also enables operation of the cell at higher current densities and with a wider range of electrolyte pH. Of importance, also, is that it provides a cell of higher voltage.

The mercuric dioxychromate can be produced in several ways: One method which I have used in making the depolarizer for the cell of this invention is to mix 342.6 grams of mercuric nitrate $3Hg(NO_3)_2.H_2O$ and 194 grams of potassium chromate $3K_2CrO_4$ with enough water to dissolve both. When completely reacted to produce a relatively insoluble precipitate of mercuric dioxychromate, it is washed free of any residual reaction products such as potassium nitrate and chromic acid. It is then dried and mixed in the ratio of 8 parts mercuric dioxychromate and 1 part of Shawinigan carbon. To provide a bobbin suitable for use in primary cells, I add to this mixture an equal weight of a suitable electrolyte, such as zinc sulfate, magnesium sulfate or magnesium acetate.

Referring now to the drawing, reference numeral 1 denotes the zinc can serving as the container and anode, which is preferably slightly amalgamated before use to assure maximum shelf life and uniform utilization of the anode surface. The can is lined with a laminate 2 and 2a comprising a .004" layer of Dexter paper and a .0009" layer of cellophane (regenerated cellulose film). Alternately, other suitable ionically permeable spacers may be used. A cathode bobbin 3, prepared by milling 8 parts of mercuric dioxychromate with 1 part of Shawinigan carbon black, mixed with an equal weight of a 20% aqueous solution of zinc sulfate, is placed in the lined container, on the bottom of which is plastic disc 4. A hole is pierced in the bobbin and carbon rod 5 is inserted, the bobbin being thereby expanded against the laminate liner to afford good contact. After a preliminary consolidation, the top of the liner is folded over the bobbin and covers the top up to the carbon rod. A waxed cardboard washer 6 is forced over the carbon rod and force fitted into the zinc can at a pressure of about 100 lbs. per square inch. This further expands the bobbin against the laminate and holds it in firm contact. A stainless steel terminal cap 7 is placed on the end of the carbon rod and the free space above the waxed cardboard disc is filled with an epoxy resin 8 to seal the cell.

The open circuit potential of the cell is about 1.50 volts; it has a high ampere hour capacity and on discharge, maintains a flat voltage curve. The use of a magnesium anode instead of zinc will provide a cell of higher voltage and the use of a cadmium anode will provide a cell of lower voltage. The electrolytes described may be immobilized by the addition of sodium cellulose sulfate, which differs from other types of gels in that it does not hydrolize. In addition to the cell construction shown, other structures may be utilized, such as flat, button and stack types.

The mercuric dioxychromate is more stable than the mercuric dioxysulfate throughout a wide pH range of electrolyte and therefore does not require the addition of buffers to control the electrolyte within a specific range.

The cell system has an overall reaction of

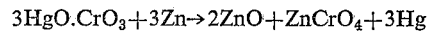

The cathode reaction products appear in the bobbin.

In the cell of this invention, there is no substantial increase in volume of the depolarizer bobbin during or after complete discharge of the cell. There is, therefore, no tendency to leak end product materials, such as occurs with discharged conventional zinc carbon cells, with consequent damage to contiguous parts or equipment.

I claim:

1. An electric current producing cell comprising an anode, an electrolyte, and a cathode depolarizer, the major part of which is composed of mercuric dioxychromate, said cathode depolarizer being substantially insoluble in said electrolyte.

2. An electric current producing cell comprising an anode, an electrolyte, and a cathode depolarizer consisting essentially of mercuric dioxychromate and a finely divided electronically conductive material, said cathode depolarizer being substantially insoluble in said electrolyte.

3. An electric current producing cell comprising a zinc anode, an electrolyte, and a cathode mix comprising mercuric dioxychromate and carbon, said cathode mix being substantially insoluble in said electrolyte.

4. An electric current producing cell having an anode selected from the group consisting of zinc, magnesium and cadmium, an electrolyte, and a cathode depolarizer, the major part of which is composed of mercuric dioxychromate, said cathode depolarizer being substantially insoluble in said electrolyte.

5. An electric current producing cell comprising an anode, an electrolyte selected from the group comprising zinc sulfate, magnesium sulfate and magnesium acetate, and a cathode depolarizer, the major part of which is composed of mercuric dioxychromate, said cathode depolarizer being substantially insoluble in said electrolyte.

6. An electric current producing cell comprising a zinc anode, a zinc sulfate electrolyte, and a depolarizer, the major part of which is composed of mercuric dioxychromate, said depolarizer being substantially insoluble in said electrolyte.

7. A cathode depolarizer electrode for electric current producing cells constituted by a compressed coherent body consisting essentially of an intimate mixture of a major portion of mercuric dioxychromate and a minor portion of finely divided electronically conductive material, and an inert terminal in electrical contact with said body, said electrode being substantially insoluble in an electrolyte selected from the group consisting of zinc sulfate, magnesium sulfate and magnesium acetate.

References Cited in the file of this patent

UNITED STATES PATENTS

| | | |
|---|---|---|
| 165,452 | Leclanché | July 13, 1875 |
| 1,560,379 | Darimont | Nov. 3, 1955 |
| 2,814,663 | Ruben | Nov. 26, 1957 |
| 2,814,664 | Ruben | Nov. 26, 1957 |

FOREIGN PATENTS

| | | |
|---|---|---|
| 602,206 | Canada | July 26, 1960 |